Feb. 2, 1943.  L. N. LEUM ET AL  2,309,652
REMOVAL OF MERCAPTANS FROM MERCAPTAN-SOLVENT MIXTURES
Filed March 21, 1941
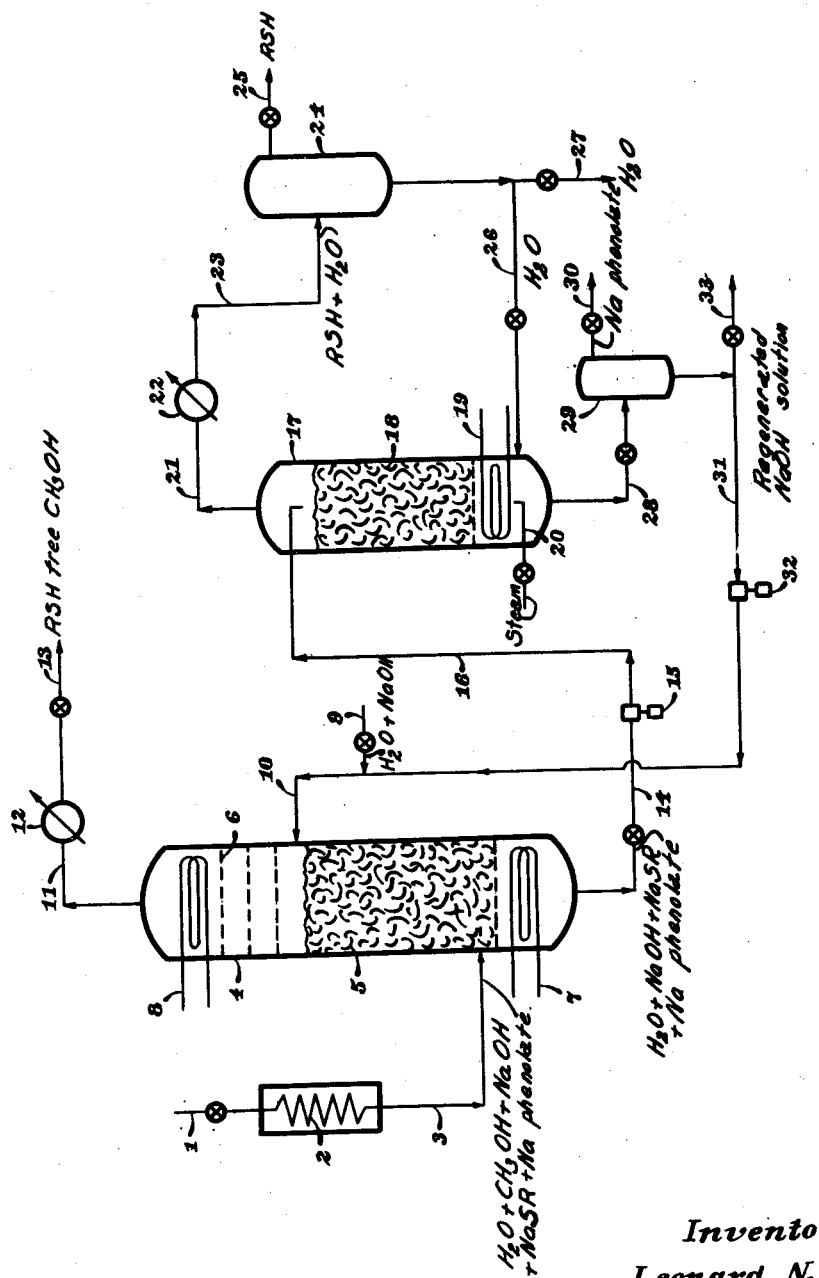
Attest
John G. Buty
Andrew T. Zodl
Inventors
Leonard N. Leum
Edwin R. Birkhimer
By Norbert E. Bich
Their Attorney Patented Feb. 2, 1943

2,309,652

UNITED STATES PATENT OFFICE 2,309,652

REMOVAL OF MERCAPTANS FROM MERCAPTAN-SOLVENT MIXTURES

Leonard N. Leum, Upper Darby, and Edwin R. Birkhimer, Philadelphia, Pa., assignors to The Atlantic Refining Company, Philadelphia, Pa., a corporation of Pennsylvania Application March 21, 1941, Serial No. 384,604

7 Claims. (Cl. 202—67)

The present invention relates to a method for separating mercaptans from organic solvents containing same, and more particularly to the separation of mercaptans from mercaptan-alcohol mixtures produced during the regeneration of spent alcoholic alkali solutions resulting from the treatment of mercaptan-containing hydrocarbon oils with alcoholic alkali solutions.

It has been proposed heretofore to desulfurize hydrocarbon oils, and particularly gasoline, by treating same with alcoholic alkali solutions or alcoholic alkali solutions containing varying amounts of water, whereby mercaptans contained in the gasoline are converted into alkali mercaptides and extracted from the oil. It has also been proposed to regenerate the spent alcoholic alkali solutions containing mercaptides by distilling the alcohol from the spent solution and thereafter heating the residue to decompose the mercaptides and drive off the resulting mercaptans, whereby the alkali is regenerated for reuse. However, one of the major difficulties encountered in this method of regeneration is that in the initial distillation to recover the alcohol from the spent solution, considerable quantities of mercaptans are liberated and thus contaminate the recovered alcohol, thereby rendering same unfit for reuse in the desulfurization of additional quantities of gasoline. In order to overcome this difficulty, it has further been proposed to remove the mercaptans from the alcohol by passing the mixture, in vapor phase, through a body or pool of aqueous alkali solution maintained at a temperature sufficiently elevated to prevent condensation of the alcohol vapors, while permitting conversion of the mercaptans to mercaptides soluble in said aqueous solution. We have found that this method of removing mercaptans from alcohol, although capable of reducing the mercaptan content of the alcohol considerably, was not effective in producing alcohol sufficiently free of mercaptans that it could be reused in the desulfurization of additional quantities of gasoline. Such method was unsatisfactory due to the fact that at the elevated temperatures necessary to prevent alcohol from accumulating in the pool of aqueous alkali solution, the mercaptans which may have been converted to alkali mercaptides were immediately decomposed to mercaptans which passed from the solution along with the alcohol vapors, thus defeating the purpose of the process.

However, in accordance with the present invention, we have been able to separate from a mercaptan-solvent mixture, and particularly a mercaptan-alcohol mixture, sufficient of the mercaptan content to produce alcohol suitable for use in the desulfurization of hydrocarbon oils. This we accomplish by passing a vaporized mercaptan-alcohol mixture in intimate countercurrent contact with an aqueous alkali solution under such conditions that the vaporized alcohol may be continuously and completely separated from the solution while the mercaptan content of the alcohol is converted into alkali mercaptides which are soluble in the solution and which may be removed therewith. The alkali solution containing mercaptides may then be treated to decompose the mercaptides and regenerate the alkali, and the alkali may be again used for the treatment of additional quantities of the mercaptan-alcohol mixture. We have thus provided a continuous, cyclic process for the substantial separation of mercaptans from alcohol, whereby there may be produced alcohol suitable for reuse in the desulfurization of hydrocarbon oils.

Our invention may be further understood with reference to the accompanying drawing, which illustrates diagrammatically a system suitable for carrying out our process.

Referring to the drawing, a spent treating solution which has been employed in the desulfurization of hydrocarbon oil and which comprises, for example, water, methanol, sodium hydroxide, sodium mercaptides and sodium phenolates, the mercaptide content of which represents about 350 mg. of sulfur as RSH per 100 cc., is passed from valve-controlled pipe I through heating coil 2 and pipe 3 into the lower section of tower 4 provided with packing 5 such as broken pumice, tile, or the like, and with bubble trays 6, heating coil 7 and dephlegmating coil 8. The spent solution, prior to its introduction into tower 4, may be heated in heating coil 2 to a temperature sufficient to vaporize the methanol and at least a portion of the mercaptans and water contained in the solution, the temperature being of the order of 150° F. to 300 F. An aqueous solution of alkali, for example, an aqueous solution of sodium hydroxide of 47% concentration, is introduced by means of valve-controlled pipe 9 and pipe 10 into tower 4 at a point above the packing 5 and below bubble trays 6. The concentration of the alkali solution may vary within the range of from about 10% to about 50%, and we prefer to employ strong solutions, i. e., from about 35% to about 50% concentration, thus reducing the quantity of water to be handled and increasing the effectiveness of mercaptan removal. The quantity of alkali solution likewise may be varied depending upon the amount of mercaptans to be removed, and we have found that from about 40% to 100% by volume of strong alkali solution, based upon the volume of alcohol to be treated, gives very satisfactory results. However, larger or smaller quantities of alkali solution may be used, depending upon the conditions of operation. For example, quantities of from about 10% to about 200% may be utilized.

The sodium hydroxide solution introduced through pipe 10 flows downwardly over the packing 5 in intimate countercurrent contact with the upwardly flowing vapors of methanol and mercaptans from the spent solution introduced into the lower portion of the tower through pipe 3, heat being supplied to the contents of the tower by means of steam circulated through heating coil 7. Temperatures at the bottom of the tower may be of the order of 250° F. to 300° F., while those prevailing at the top of the tower in the vicinity of the dephlegmating coil 8 are of the order of 160° F.–170° F. In general, a temperature gradient will prevail throughout the tower, the temperature at the bottom thereof being substantially the boiling temperature of the solution, while the temperature at the top approximates the boiling point of the methanol. The methanol vapors contaminated with mercaptans, in passing upwardly in countercurrent contact with the descending flow of aqueous sodium hydroxide solution, are substantially freed of mercaptans upon reaching the upper level of packing 5. The mercaptans are converted into sodium mercaptides and pass downwardly through the packing 5 in solution in the aqueous sodium hydroxide. The methanol vapors, containing little or no mercaptans and only a small amount of water, are passed upwardly through the bubble trays 6 which constitute a fractionating section in the upper portion of the tower. By means of the bubble trays 6 and dephlegmating coil 8, the methanol vapors are substantially freed of water and are withdrawn from the top of tower 4 by means of pipe 11, condensed in condenser 12, and passed to storage (not shown) by means of valve-controlled pipe 13. The methanol thus recovered contains only a very small amount of mercaptans, for example, less than 5 mg. of mercaptan sulfur per 100 cc., and is entirely suitable for use in making up fresh or regenerated methanol-sodium hydroxide solutions for treating additional quantities of mercaptan-containing hydrocarbon oil.

The solution, substantially free of methanol, and comprising water, sodium hydroxide, sodium mercaptides and sodium phenolates, is withdrawn from the bottom of tower 4 by means of valve-controlled pipe 14 and delivered by pump 15 and pipe 16 to regenerating tower 17 provided with suitable contacting means such as packing 18, and with heating coil 19 and open steam jet 20. Heat is applied to the solution descending through the packing 18 by circulating steam through coil 19, or by injecting open steam into the solution through steam jet 20. The temperature at the bottom of the tower may be of the order of 280° F., while that at the top of the tower is about 215° F.–220° F. As a result of the heating, the mercaptides are decomposed to mercaptans with the liberation of an equivalent amount of sodium hydroxide, and the mercaptans and a portion of the water content of the solution are vaporized, withdrawn from the top of tower 17 through pipe 21, condensed in condenser 22, and the condensate delivered by pipe 23 to separator 24. The condensate is permitted to settle and stratify in separator 24, whereby there is formed an upper layer of insoluble mercaptans and a lower layer of water containing traces of mercaptans. The upper layer of mercaptans is removed from separator 24 by means of valve-controlled pipe 25, and may be disposed of as desired. The lower aqueous layer may be withdrawn from the bottom of the separator, and all or a portion thereof may be returned to regenerating tower 17 by means of valve-controlled pipe 26. In the event that open steam is supplied to tower 17 by means of jet 20, it may be necessary to return only a portion of the water from separator 24, and the remainder may be withdrawn from the system through valve-controlled pipe 27. In this manner the quantity of water in the solution reaching the bottom of tower 17 may be maintained at any desired percentage.

The regenerated aqueous solution of sodium hydroxide, which may contain sodium phenolates, is withdrawn from the bottom of tower 17 and passed by means of valve-controlled pipe 28 into separator 29, wherein any insoluble sodium phenolates are separated as an upper layer which may be drawn off through valve-controlled pipe 30 and disposed of as desired. The lower layer of regenerated aqueous sodium hydroxide, of for example, 47% concentration, is withdrawn from the bottom of separator 29, and a portion thereof is returned by means of pipe 31, pump 32, and pipe 10 to tower 4. The remainder of the regenerated sodium hydroxide is drawn from the system by means of valve-controlled pipe 33, and may be employed for making up fresh oil-treating agent, using the recovered, substantially mercaptan-free methanol from valve-controlled pipe 13.

In lieu of charging to tower 4, a spent oil-treating agent comprising a methanol-water mixture containing sodium hydroxide, sodium mercaptides and sodium phenolates, we may first subject such spent oil-treating agent to heating or steaming, whereby the methanol and mercaptans driven off from the spent agent by such treatment constitute a suitable charge material for our process. In this case the methanol contaminated with mercaptans is passed through valve-controlled pipe 1, heating coil 2, and pipe 3 directly into the lower portion of tower 4, and the methanol vapors are relieved of their mercaptan content by the sodium hydroxide solution in exactly the same manner as described hereinbefore. While we have set forth herein the separation of mercaptans from a specific alcohol, namely, methanol, it is obvious that our method is applicable to the removal of mercaptans from other organic solvents such as ethanol, propanol, acetone, and equivalent solvents which are suitable for use as constituents of oil-treating agents. Furthermore, while we prefer to employ sodium hydroxide due to its availability and cheapness, we may use other basic substances such as sodium carbonate, potassium hydroxide or carbonate, and the like.

The following examples serve to illustrate the results which may be obtained in accordance with our invention. By way of comparison, an example is also presented showing the results obtained by operating in accordance with a prior art method referred to hereinbefore.

Following the method of the present invention, methanol containing 300–350 mg. sulfur as RSH per 100 cc. was vaporized and passed upwardly through a packed tower in intimate countercurrent contact with a descending flow of 50% NaOH solution, the temperature at the bottom of the tower being 280° F. and at the top of the tower 165° F. The treated methanol vapors were withdrawn from the top of the tower and condensed. The volume percent NaOH solution employed, based upon the volume of methanol treated, as well as the RSH content of the treated methanol, are given in the following table. The empirical formula RSH represents mercaptans containing from 1 to 6 carbon atoms per molecule.

| Charge | Vol. % NaOH solution | Mg. S as RSH per 100 cc. of treated methanol |
|---|---|---|
| Methanol containing 300 mg. S as RSH per 100 cc | 43 | 5 |
| Do | 63 | 1 |
| Methanol containing 350 mg. S as RSH per 100 cc | 92 | 3 |

In accordance with a prior art method hereinbefore referred to, methanol containing 300 mg. sulfur as RSH per 100 cc. was vaporized and passed through a relatively quiescent pool of 50% NaOH solution maintained at a temperature of 280° F., which temperature was found necessary to prevent condensation and accumulation of the methanol in the NaOH solution. The treated methanol vapors were passed from contact with the solution and condensed. The volume percent NaOH solution employed, based upon the volume of methanol treated, as well as the RSH content of the treated methanol, are given in the following table.

| Charge | Vol. % NaOH solution | Mg. S as RSH per 100 cc. of treated methanol |
|---|---|---|
| Methanol containing 300 mg. S as RSH per 100 cc | 160 | 90 |

From the data above given, it will be evident that by the method of the present invention the methanol was rendered substantially free of mercaptans, whereas the methanol treated in accordance with the prior art method, using much larger quantities of NaOH solution, contained a very substantial proportion of mercaptans, i. e., 90 mg. S. as RSH per 100 cc. Furthermore, the methanol processed by the method of the present invention was sufficiently free of mercaptans to be immediately utilizable for desulfurizing mercaptan-containing oils, while the methanol processed by the prior art method was totally unsuitable for such purpose.

What we claim is:

1. The method of separating mercaptans from a lower aliphatic alcohol containing same, which comprises countercurrently contacting said alcohol containing mercaptans, substantially in the vapor phase, with an aqueous solution of an alkaline reagent at a temperature sufficiently elevated to prevent condensation of said alcohol vapors.

2. The method of separating mercaptans from a lower aliphatic alcohol containing same, which comprises countercurrently contacting said alcohol containing mercaptans, substantially in the vapor phase, with an aqueous solution of an alkaline reagent at a temperature sufficiently elevated to prevent condensation of said alcohol vapors, separating from said aqueous solution, alcohol vapors having a substantially reduced mercaptan content, and condensing said alcohol vapors.

3. The method of separating mercaptans from methanol containing same, which comprises countercurrently contacting said methanol containing mercaptans, substantially in the vapor phase, with an aqueous solution of an alkaline reagent at a temperature sufficiently elevated to prevent condensation of said methanol vapors, separating from said aqueous solution, methanol vapors having a substantially reduced mercaptan content, and condensing said methanol vapors.

4. The method of separating mercaptans from a lower aliphatic alcohol containing same, which comprises introducing an aqueous solution of an alkaline reagent into the upper portion of a contacting zone, introducing alcohol containing mercaptans, in a vaporous state, into the lower portion of said zone, passing said vapors upwardly in intimate countercurrent contact with a descending stream of said aqueous solution at a temperature sufficiently elevated to prevent condensation of said alcohol vapors, and withdrawing from the upper portion of said zone alcohol vapors having a substantially reduced mercaptan content, and from the lower portion of said zone an aqueous alkaline solution containing mercaptans removed from said alcohol.

5. The method of separating mercaptans from a lower aliphatic alcohol containing same, which comprises introducing an aqueous solution of an alkaline reagent into the upper portion of a contacting zone, introducing alcohol containing mercaptans, in a vaporous state, into the lower portion of said zone, passing said vapors upwardly in intimate countercurrent contact with a descending stream of said aqueous solution at a temperature sufficiently elevated to prevent condensation of said alcohol vapors, withdrawing from the upper portion of said zone alcohol vapors having a substantially reduced mercaptan content, and from the lower portion of said zone an aqueous alkaline solution containing mercaptans removed from said alcohol, heating said aqueous alkaline solution to drive off said mercaptans and to regenerate said alkaline reagent, and returning at least a portion of said regenerated alkaline reagent to the upper portion of said contacting zone.

6. The method of separating mercaptans from methanol containing same, which comprises countercurrently contacting said methanol containing mercaptans, substantially in the vapor phase, with an aqueous solution of sodium hydroxide at a temperature of from about 160° F. to about 300° F., separating from the aqueous solution, methanol vapors having a substantially reduced mercaptan content, and condensing said vapors.

7. The method of separating mercaptans from methanol containing same, which comprises introducing an aqueous solution of sodium hydroxide containing from about 35% to about 50% by weight NaOH into the upper portion of a contacting zone, introducing methanol containing mercaptans into the lower portion of said zone, passing said methanol containing mercaptans, substantially in the vapor phase, upwardly in intimate countercurrent contact with a descending stream of said aqueous solution, the temperature in the upper portion of said contacting zone being of the order of 160° F.–170° F. and in the lower portion of said zone 250° F.–300° F., and withdrawing from the upper portion of said zone methanol vapors having a substantially reduced mercaptan content, and from the lower portion of said zone an aqueous solution of sodium hydroxide containing mercaptans removed from said methanol.

LEONARD N. LEUM.
EDWIN R. BIRKHIMER.